United States Patent [19]

Fisher

[11] Patent Number: 5,563,997
[45] Date of Patent: Oct. 8, 1996

[54] METHOD AND APPARATUS FOR SORTING RECORDS INTO A LIST BOX IN A GRAPHIC USER INTERFACE

[75] Inventor: Clay Fisher, Palo Alto, Calif.

[73] Assignee: Canon Kabushiki Kaisha, Tokyo, Japan

[21] Appl. No.: 977,005

[22] Filed: Nov. 16, 1992

[51] Int. Cl.⁶ .................................................. G06F 17/30
[52] U.S. Cl. ......................... 395/148; 395/600; 395/157
[58] Field of Search .................................. 395/144–148, 395/149, 150–155, 156–161, 600, 800

[56] References Cited

U.S. PATENT DOCUMENTS

| | | | |
|---|---|---|---|
| 4,209,845 | 6/1980 | Berger et al. | 395/800 |
| 4,295,206 | 10/1981 | Cain et al. | 395/600 |
| 4,417,321 | 11/1983 | Chang et al. | 395/600 |
| 4,611,280 | 9/1986 | Linderman | 395/800 |
| 4,633,393 | 12/1986 | Rundell | 395/800 |
| 4,739,477 | 4/1988 | Barker et al. | 395/600 |
| 4,809,158 | 2/1989 | McCauley | 395/600 |
| 4,939,639 | 6/1990 | Lee et al. | 395/800 |
| 4,939,689 | 7/1990 | Davis et al. | 395/600 |
| 4,962,451 | 10/1990 | Case et al. | 395/600 |
| 5,117,495 | 5/1992 | Liu | 395/600 |
| 5,146,590 | 9/1992 | Lorie et al. | 395/600 |
| 5,148,541 | 9/1992 | Lee et al. | 395/600 |

OTHER PUBLICATIONS

Kroenke, David, "Database Processing" 2$^{nd}$ edition; Science Research Associates Inc., 1983. pp. 115–116.
Edson, Dave "Daves Top Ten List of Tricks, Hints and Techniques for Programming Windows" Microsoft Systems Journal Oct. 92, vol. 7, No. 6 p. 31.
Microsoft Works User's Guide for Packard Bell Computers, Doc. No. EB0102-200-R00-0689, 1989 pp. 179–237.
Jenkins, Avery L. "How Databases Do Multimedia", Digital News and Review, Aug. 24, 1992, vol. 9, No. 16 p. 87(4).

Primary Examiner—Heather R. Herndon
Assistant Examiner—Joseph H. Feild
Attorney, Agent, or Firm—Fitzpatrick, Cella, Harper & Scinto

[57] ABSTRACT

Method and apparatus for using two intermediary list boxes to display and sort a list of records by a column other than a first column of the records. To use the intermediary list boxes, the records are indexed, a sort column is selected, the columns in the records are reordered such that the selected sort column is first, and the reordered records are inserted into the first intermediary list box so as to sort the records based on the selected sort field. As each record is sorted by the first intermediary list box, a sort index returned by the first intermediary index is obtained and used to insert the record index for each record into the second intermediary list box at a position corresponding to the sort index returned from the first list box. The second intermediary list box is then sequentially accessed to obtain sorted indexes of the records. The records are then displayed, with their columns arranged in any order, based on the sorted record indexes stored in the second intermediary list box.

36 Claims, 17 Drawing Sheets

Retrieve from Optical Disk

INDEX CELLS
[* denotes marked cells]

● 1-25    ○ 51-75
○ 26-50    ○ 76-100

| *] A-E | IN BASKET | CANOFILE 250 | MICROGRAPHICS | LBP |
|---|---|---|---|---|
| *] F-J | ADMIN. | PRODUCTION | SHIPPING | FINANCE |
| *] K-O | LETTERS | PRODUCT RELEASE | BULLETIN | MANUALS |
| *] P-T | JAN. 1 9 0 - MAR. 9 0 | APR. 1 9 0 - JUN. 9 0 | JUL. 1 9 0 - SEP. 9 0 | OCT. 1 9 0 - DEC. 9 0 |
| *] U-Z | 0000 - 2499 | 2500 - 4999 | 5000 - 7499 | 7500 - 9999 |

Name: ▭ — 32
Number: ▭ — ▭ — 33
Revision date [d-m-y]: ▭ — ▭ — 34
Creation date [d-m-y]: ▭ — ▭ — 35

[ Clear all fields ]    [ Retrieve ]
☐ Auto-clear fields
[ Cancel ]

Document List Options

Sort by
- ● No sort
- ○ First field

[OK] [Cancel]

Order of index fields

☒ DOC name  ☒ DOC #  ☐ Date created  ☐ Date revised

New order:
| No. | DOC name | DOC # | Pages |

Current order:
| No. | DOC name | DOC # | Pages |

FIG.5(a)

CFView

File  Retrieve  View  Options  Catalog  Help

| No. | DOC name | DOC # | Pages |
|---|---|---|---|
| 1 | WESTINGHOUSE WINS SMART SKIN CON | 110289 | 2 |
| 2 | ARMY REVAMPS PG TO MODERNIZE EQU | 12389 | 1 |
| 3 | U.S MAY GROUND 24-HR COMM PLANE | 121589 | 2 |
| 4 | PENT LOWERS FORCE # EUR EXERCISE | 41589 | 1 |
| 5 | GEN WARNS OF LOW $ 4 COMP SOFTWA | 13089 | 1 |
| 6 | AT&T SUPPLIES FIBER-OPTIC CABLE | 71389 | 1 |
| 7 | NAVY TO TEST SEA LANCE | 91189 | 1 |
| 8 | ARMY SEEKS $260 MIL 4 APACHE AH6 | 61489 | 1 |
| 9 | COURT ACTION PROMPS SET-ASIDE CK | 31789 | 1 |
| 10 | ARMY GROUNDS CHINOOKS AGAIN CH47 | 32189 | 1 |
| 11 | DOD SMALL BUS AWARDS DECLINE 88 | 10689 | 1 |
| 12 | COMP IMAGING SIMULATES TROOP MOV | 13089 | 1 |
| 13 | NAV PUTS 1 SSN-688 SUB IN BUDGET | 42489 | 1 |
| 14 | B-1B BOMBER NEW RADAR ANTENNAS | 13089 | 1 |
| 15 | SIDEWINDER BY FORD AREOSPACE | 1989 | 1 |
| 16 | ALLIES WAITING 4 U.S. ON ASEAAM | 110489 | 1 |
| 17 | SCORPION MULTIPURP INDIVID AMMO | 1989 | 1 |
| 18 | STINGRAY WEAPONS SYSTEMS | 1989 | 6 |
| 19 | GREEN | 234567890 | 1 |
| 20 | T&A BATCH JAN 89 | | 4 |
| 21 | REDDY | 245886532 | 1 |
| 22 | LITTLE | 997231192 | 1 |

List type: Optical disk

Current Disk: DISK 1A

Message: There were 210 matching documents located

Current Catalog: c:\cfv\win\clay1\cat1

FIG.5(b)

Document List Options

Sort by
- ● No sort
- ○ First field

Order of index fields

☒ DOC name  ☒ DOC #  ☒ Date created  ☒ Date revised

New order:

| No. | DOC name | DOC # | Created | Revised | Pages |
|---|---|---|---|---|---|

Current order:

| No. | DOC name | DOC # | Created | Revised | Pages |
|---|---|---|---|---|---|

[OK]  [Cancel]

FIG.6(a)

| No. | DOC name | DOC # | Created | Revised | Pages |
|---|---|---|---|---|---|
| 1 | WESTINGHOUSE WINS SMART SKIN CON | 110289 | 29-03-1990 | 29-03-1990 | 2 |
| 2 | ARMY REVAMPS PG TO MODERNIZE EQU | 12389 | 29-03-1990 | 29-03-1990 | 1 |
| 3 | U.S MAY GROUND 24-HR COMM PLANE | 121589 | 29-03-1990 | 29-03-1990 | 2 |
| 4 | PENT LOWERS FORCE # EUR EXERCISE | 41589 | 29-03-1990 | 29-03-1990 | 1 |
| 5 | GEN WARNS OF LOW $ 4 COMP SOFTWA | 13089 | 29-03-1990 | 29-03-1990 | 1 |
| 6 | AT&T SUPPLIES FIBER-OPTIC CABLE | 71389 | 29-03-1990 | 29-03-1990 | 1 |
| 7 | NAVY TO TEST SEA LANCE | 91189 | 29-03-1990 | 29-03-1990 | 1 |
| 8 | ARMY SEEKS $260 MIL 4 APACHE AH6 | 61489 | 29-03-1990 | 29-03-1990 | 1 |
| 9 | COURT ACTION PROMPS SET-ASIDE CK | 31789 | 29-03-1990 | 29-03-1990 | 1 |
| 10 | ARMY GROUNDS CHINOOKS AGAIN CH47 | 32189 | 29-03-1990 | 29-03-1990 | 1 |
| 11 | DOD SMALL BUS AWARDS DECLINE 88 | 10689 | 30-03-1990 | 30-03-1990 | 1 |
| 12 | COMP IMAGING SIMULATES TROOP MOV | 13089 | 30-03-1990 | 30-03-1990 | 1 |
| 13 | NAV PUTS 1 SSN-688 SUB IN BUDGET | 42489 | 30-03-1990 | 30-03-1990 | 1 |
| 14 | B-1B BOMBER NEW RADAR ANTENNAS | 13089 | 30-03-1990 | 30-03-1990 | 1 |
| 15 | SIDEWINDER BY FORD AEROSPACE | 1989 | 30-03-1990 | 30-03-1990 | 1 |
| 16 | ALLIES WAITING 4 U.S. ON ASEAAM | 110489 | 30-03-1990 | 30-03-1990 | 1 |
| 17 | SCORPION MULTIPURP INDIVID AMMO | 1989 | 30-03-1990 | 30-03-1990 | 1 |
| 18 | STINGRAY WEAPONS SYSTEMS | 1989 | 30-03-1990 | 30-03-1990 | 6 |
| 19 | GREEN | 2345667890 | 30-03-1990 | 30-03-1990 | 1 |
| 20 | T&A BATCH JAN 89 | | 30-03-1990 | 30-03-1990 | 4 |
| 21 | REDDY | 245886532 | 30-03-1990 | 30-03-1990 | 1 |
| 22 | LITTLE | 997231192 | 30-03-1990 | 30-03-1990 | 1 |

List type: Optical disk    Message: There were 210 matching documents located

Current Disk: DISK 1A    Current Catalog: c:\cfv\win\clay1\cat1

| No. | DOC # | DOC name | Created | Revised | Pages |
|---|---|---|---|---|---|
| 1 | K723ST00190132 | | 30-03-1990 | 30-03-1990 | 1 |
| 2 | | 1348 FORMS BATCH 5. 15 JUNE 89 | 30-03-1990 | 30-03-1990 | 5 |
| 3 | | P448IE91521658 | 30-03-1990 | 30-03-1990 | 1 |
| 4 | | SUBJECT FILING (GSA) | 30-03-1990 | 30-03-1990 | 2 |
| 5 | | P170IE91521655 | 30-03-1990 | 30-03-1990 | 1 |
| 6 | | TEST SAMPLE | 22-06-1990 | 22-06-1990 | 2 |
| 7 | | check 27 | 11-08-1990 | 11-08-1990 | 34 |
| 8 | | check 29 | 11-08-1990 | 11-08-1990 | 17 |
| 9 | | | 11-08-1990 | 11-08-1990 | 17 |
| 10 | | check 26 | 11-08-1990 | 11-08-1990 | 17 |
| 11 | | check 25 | 11-08-1990 | 11-08-1990 | 34 |
| 12 | | P448IE91521656 | 30-03-1990 | 30-03-1990 | 1 |
| 13 | | P170IE91521654 | 30-03-1990 | 30-03-1990 | 1 |
| 14 | | FILE CODES AS CLASSIFICATION | 30-03-1990 | 30-03-1990 | 7 |
| 15 | | SUBJECT CATEGORY AGENCY RECORDS | 30-03-1990 | 30-03-1990 | 5 |
| 16 | | | 11-08-1990 | 11-08-1990 | 17 |
| 17 | | | 11-08-1990 | 11-08-1990 | 7 |
| 18 | | A-COPY | 12-07-1990 | 12-07-1990 | 1 |
| 19 | | demo 13 | 12-07-1990 | 12-07-1990 | 2 |
| 20 | | cbs 1 | 12-07-1990 | 12-07-1990 | 2 |
| 21 | | demo 1 | 12-07-1990 | 12-07-1990 | 1 |
| 22 | | demo 14 | 12-07-1990 | 12-07-1990 | 2 |

List type: Optical disk    Message: There were 210 matching documents located
Current Disk: DISK 1A      Current Catalog: c:\cfv\win\clay1\cat1

FIG.10(b)

Document List Options

Sort by
- ○ No sort
- ● First field

[OK]
[Cancel]

Order of index fields

☒ DOC name  ☒ DOC #  ☒ Date created  ☒ Date revised

New order:

| No. | DOC name | DOC # | Created | Revised | Pages |
|---|---|---|---|---|---|

Current order:

| No. | DOC name | DOC # | Created | Revised | Pages |
|---|---|---|---|---|---|

FIG.11(a)

| | CFView | | | | |
|---|---|---|---|---|---|
| File | Retrieve View Options Catalog Help | | | | |
| No. | DOC name | DOC # | Created | Revised | Pages |
| 48 | 1348 FORMS BATCH 5. 15 JUNE 89 | | 30-03-1990 | 30-03-1990 | 5 |
| 49 | 2323233 | | 13-08-1990 | 13-08-1990 | 1 |
| 50 | A-COPY | | 12-07-1990 | 12-07-1990 | 1 |
| 51 | abc company | 1 | 13-08-1990 | 13-08-1990 | 1 |
| 52 | AIIM REPORT | 32452345 | 22-06-1990 | 22-06-1990 | 3 |
| 53 | ALLIES WAITING 4 U.S. ON ASEAAM | 110489 | 30-03-1990 | 30-03-1990 | 1 |
| 54 | ARMY GROUNDS CHINOOKS AGAIN CH47 | 32189 | 29-03-1990 | 29-03-1990 | 1 |
| 55 | ARMY REVAMPS PG TO MODERNIZE EQU | 12389 | 29-03-1990 | 29-03-1990 | 1 |
| 56 | ARMY SEEKS $260 MIL 4 APACHE AH6 | 61489 | 29-03-1990 | 29-03-1990 | 1 |
| 57 | AT&T SUPPLIES FIBER-OPTIC CABLE | 71389 | 29-03-1990 | 29-03-1990 | 1 |
| 58 | B-1B BOMBER NEW RADAR ANTENNAS | 13089 | 30-03-1990 | 30-03-1990 | 1 |
| 59 | BRANCH 22 | 490 | 04-04-1990 | 04-04-1990 | 23 |
| 60 | CANOFILE 250 89 AIIM REPORT | 1989 | 30-03-1990 | 22-06-1990 | 2 |
| 61 | CANOFILE 250 AUTOINCREMENT | 101 | 22-06-1990 | 22-06-1990 | 1 |
| 62 | CANOFILE 250 AUTOINCREMENT | 103 | 22-06-1990 | 22-06-1990 | 1 |
| 63 | CANOFILE 250 AUTOINCREMENT | 102 | 22-06-1990 | 22-06-1990 | 1 |
| 64 | CANOFILE 250 AUTOINCREMENT | 100 | 22-06-1990 | 22-06-1990 | 1 |
| 65 | canon demo | 13123123 | 24-05-1991 | 24-05-1991 | 1 |
| 66 | canon demo | 13123123 | 24-05-1991 | 24-05-1991 | 1 |
| 67 | CANON INVOICE | 1234 | 13-08-1990 | 13-08-1990 | 8 |
| 68 | CANON USA | 8888 | 12-07-1990 | 12-07-1990 | 1 |
| 69 | CASPER | 9999 | 12-07-1990 | 12-07-1990 | 1 |

List type: Optical disk   Message: There were 210 matching documents located

Current Disk: DISK 1A   Current Catalog: c\cfv\win\clay1\cat1

FIG.11(b)

METHOD AND APPARATUS FOR SORTING RECORDS INTO A LIST BOX IN A GRAPHIC USER INTERFACE

BACKGROUND OF THE INVENTION

1. Field of the Invention

The present invention pertains to a method and apparatus for using a list box to display sorted records, and particularly to a system in which the records are sorted by a column other than the first column of the record.

2. Description of the Related Art

As the use of graphic user interfaces increases, a number of standard graphic user interface programming tools have been created which simplify the development of new software application programs which operate under the graphic user interface. The graphic user interface programming tools automatically perform pre-designated functions for the programmer and automatically present and/or receive data to the end user with a pre-designated visual appearance. The programming tools thereby avoid the need for each programmer to re-program standard functions, and further avoid the need for each programmer to become concerned about how to display and/or input user data. Examples of such graphic user interface programming tools include simple tools which automatically display data in a variety of selectable formats; input tools which automatically display data with user-selectable push buttons, scroll bars, etc. which allow the end user to select a displayed data item; and complex tools which automatically manipulate data for the programmer, display the data, and allow user selection and/or modification of the displayed data. Standard programming tools are described in "Programmer's Reference, Vol. II: Functions", MICROSOFT WINDOWS™ Software Developer's Kit, Version 3.1 (MICROSOFT Part No. PC28916-0492) and "The Windows Interface: An Application Design Guide" (MICROSOFT Part No. PC28921-0692), the contents of which are incorporated herein by reference.

One kind of graphic user interface programming tool is known as a "list box". A list box automatically displays a list of records in a window and automatically allows an end user to scroll through the list and select one of the displayed records. A typical list box is shown in FIG. 12. The list box 10 includes plural records 11 which are arranged in a list. Each record includes plural columns 12 such as computer file name 12a, computer file size 12b, date created 12c, and time created 12d. A scroll bar 14 to the right of the list box allows a user to scroll through the list thereby allowing the user to view portions of the list that are not currently displayed. The user may continue to scroll through the list until a desired record is targeted, for example, by highlighting, and then may select the targeted record for further processing, for example, by pressing an enter key or by clicking on the targeted record with a mouse.

List boxes are powerful graphic user interface programming tools because they can be configured (or created) such that they insert records into the list in three different ways. First, the list box can be created such that it simply appends new records to the end of the existing list. In this configuration, the list box displays unsorted or randomly ordered records. Second, the list box can be created such that it allows the programmer to specify the location in the list where new records are to be inserted. In this configuration, the list box automatically bumps succeeding records which are already stored in the list so that the new record can be inserted into the list without losing data. Third, the list box can be created such that it automatically sorts records as it inserts new records. In this configuration, after the list box sorts each new record into the list, the list box returns the location at which the new record was inserted.

In the sort configuration, however, the list box can only sort in ascending order based on the first column of the record. This is inconvenient when it is desired to sort records based on columns other than the first, such as the second or successive columns. In this case, the graphic user interface programmer can no longer rely on a standard list box. Rather, the programmer must re-program his own sorting function, together with provisions for proper display and end user manipulation of displayed data, which distracts the programmer from the main programming task at hand. The re-coding task becomes more complicated when it is considered that the code may be ported into a foreign language which may include non-standard characters and corresponding non-standard sort sequences.

SUMMARY OF THE INVENTION

It is an object of the present invention to address the foregoing difficulties.

In one aspect, the invention concerns a novel technique for using standard list boxes to display a list of records which is sorted by a column other than the first column.

According to this aspect, the invention involves the use of two intermediary list boxes, neither of which is ordinarily displayed to the end user, to build the displayed list of records which may be sorted by any column including columns other than the first column. The first intermediary list box is created with a sort style which automatically returns a sort index. The second intermediary list box is created without a sort style. To use the intermediary list boxes, the records are indexed, a sort column is selected, the columns in the records are reordered such that the selected sort column is first, and the reordered records are inserted into the first intermediary list box so as to sort the records based on the selected sort column (sometimes referred to as "the selected sort field"). As each record is sorted by the first intermediary list box, the sort index returned by the first intermediary list box is obtained and used to insert the index for each record into the second intermediary list box at a position corresponding to the sort index returned from the first list box. The second intermediary list box is then sequentially accessed to obtain sorted indexes of the records. The sorted indexes to the records are used to create the displayed list box in any column arrangement that is desired, including an arrangement in which the sort column is not the first column.

By virtue of the foregoing arrangement, it is possible to obtain a list box containing records sorted by any arbitrary column using only standard list box programming tools. Thus, a graphics user interface programmer need not be distracted from the main programming task simply because it is desired to display lists of records sorted by arbitrary columns. Moreover, even when the application program is ported into a foreign language, the list box automatically includes the proper sequence for non-standard characters, thereby ensuring transportability from language to language.

This brief summary has been provided so that the nature of the invention may be understood quickly. A more complete understanding of the invention can be obtained by reference to the following detailed description of the preferred embodiment thereof in connection with the drawings which together form a complete part of the specification.

BRIEF DESCRIPTION OF THE DRAWINGS

FIGS. 3 and 4 are views for showing operator selection of data items for display.

FIGS. 5(a) and 5(b) and FIGS. 6(a) and 6(b) are views for showing unsorted display of selected items.

FIGS. 10(a) and 10(b) and FIGS. 11(a) and 11(b) are views showing a sorted display of records in a list box.

DETAILED DESCRIPTION OF THE PREFERRED EMBODIMENT

Figure 1:
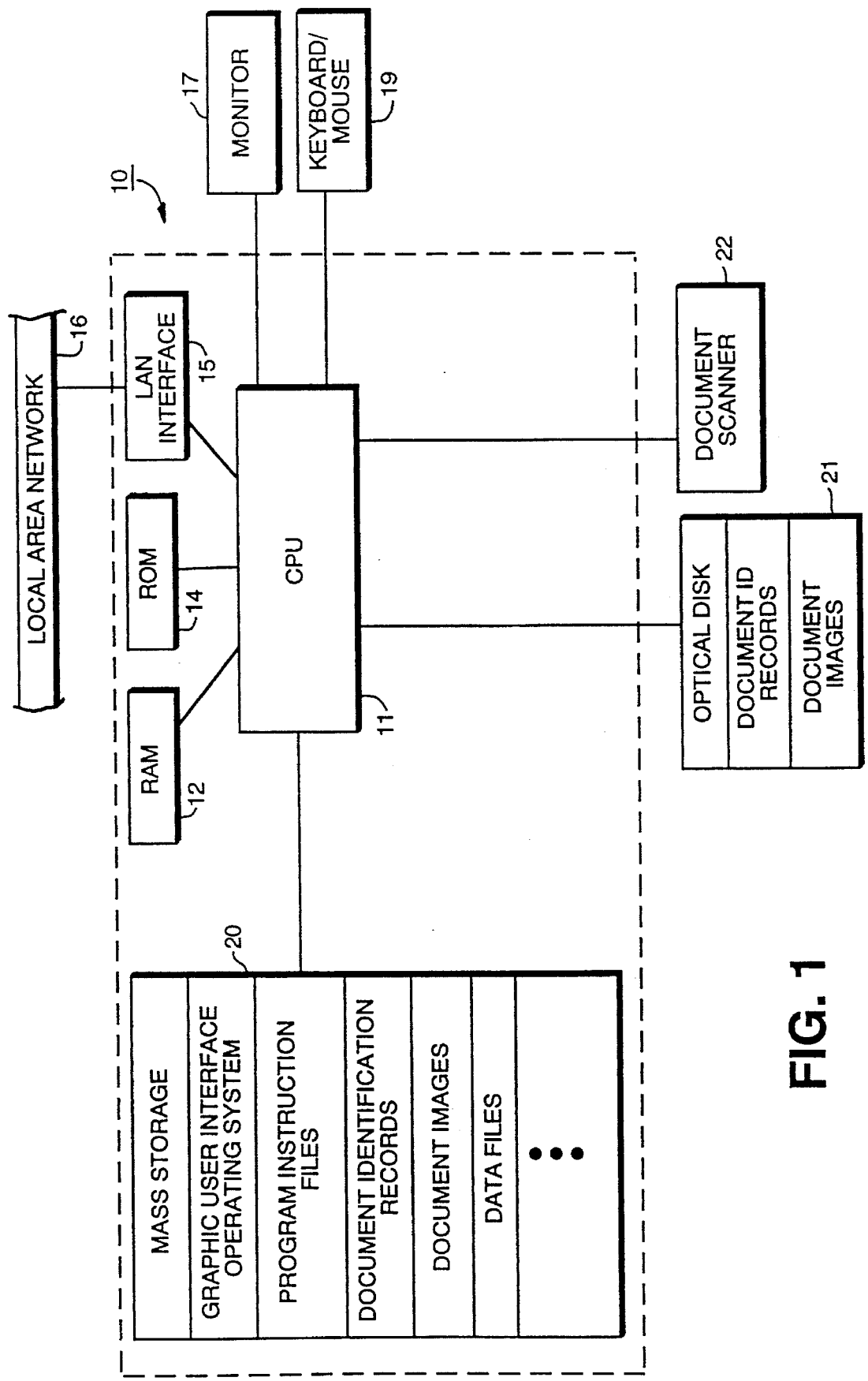
FIG. 1 is a block diagram showing an embodiment of the present invention.

FIG. 1 is a schematic block diagram of an apparatus according to the invention. In FIG. 1, reference numeral 10 designates personal computing equipment such as an IBM PC or PC-compatible computer. Computing equipment 10 includes a CPU 11 such as an 80386 microprocessor which executes stored program instructions such as operator-selected applications programs that are stored in RAM 12 or specialized functions such as start up programs or BIOS programs which are stored in ROM 14. Computing equipment 10 further includes a local area network interface device 15 which provides access to a local area network 16 whereby the computing equipment 10 can access files or programs on a remote file server, or send files for remote printing, or otherwise interact with a local area network-in accordance with known techniques, such as by sending or receiving database information.

Computing equipment 10 further includes a monitor 17 for displaying graphic user interface commands and for displaying graphic images, and a keyboard/mouse assembly 19 for allowing operator interaction with computing equipment 10.

Mass storage device 20, such as a fixed disk or a floppy disk drive, is connected for access by CPU 11. Mass storage 20 typically includes a graphic user interface operating system such as a MICROSOFT WINDOWS™ operating system which permits CPU 11 to interact with a user in a graphical user interface environment via monitor 17 and keyboard 19. Mass storage memory further includes stored program instruction sequences such as instruction sequences for accessing data files such as image files, for modifying or for adding data to such image files, for other application programs such as word processing application programs, optical character recognition programs, spreadsheet application programs, and for other information and data processing programs which may or may not be operable in the graphic user interface operating system. Additional information may be stored on mass storage 20 as desired or designated by the operator.

An optical disk 21 connected to CPU 11 provides further capability for mass storage of data files, particularly data files that include image information. Likewise, document scanner 22 allows CPU 11 to scan arbitrary images and convert those images into bit map images for storage in optical disk 21 or mass storage device 20. Scanning and storage may be performed under control of a program instruction file stored in mass storage 20, such as a program instruction file which scans arbitrary images, requests identification data for the image by which the image may be retrieved, and stores the images together with a record containing identification data in the mass storage 20 or optical disk 21. Identification data may take the form of index tokens related to the subject matter of the scanned images, as well as document name, document number, creation date and revision date, as described more fully hereinbelow.

Figure 2A:
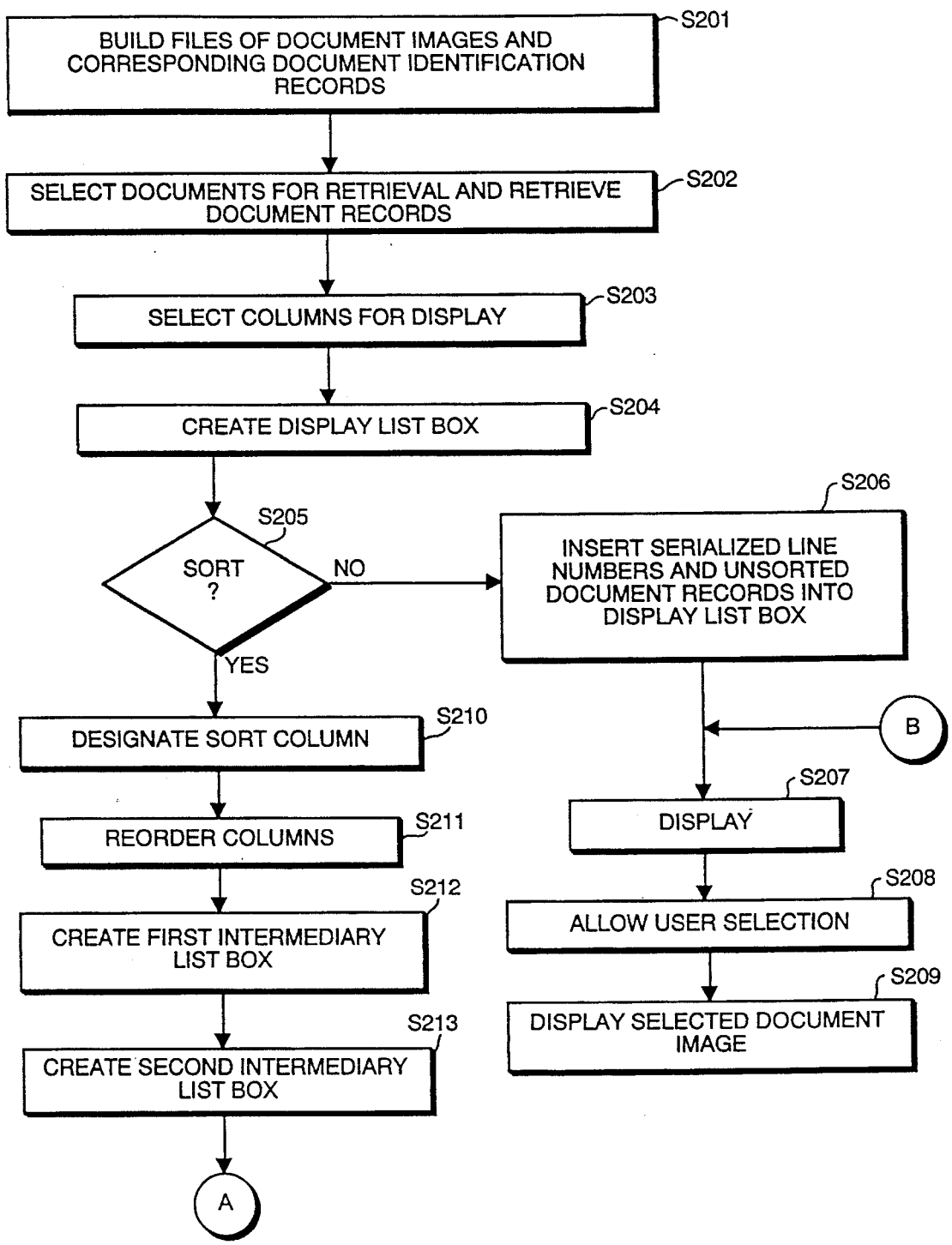
FIG. 2, comprised of FIGS. 2(a) and 2(b), is a flow diagram for explaining list box sorting according to the invention.
Figure 2B:
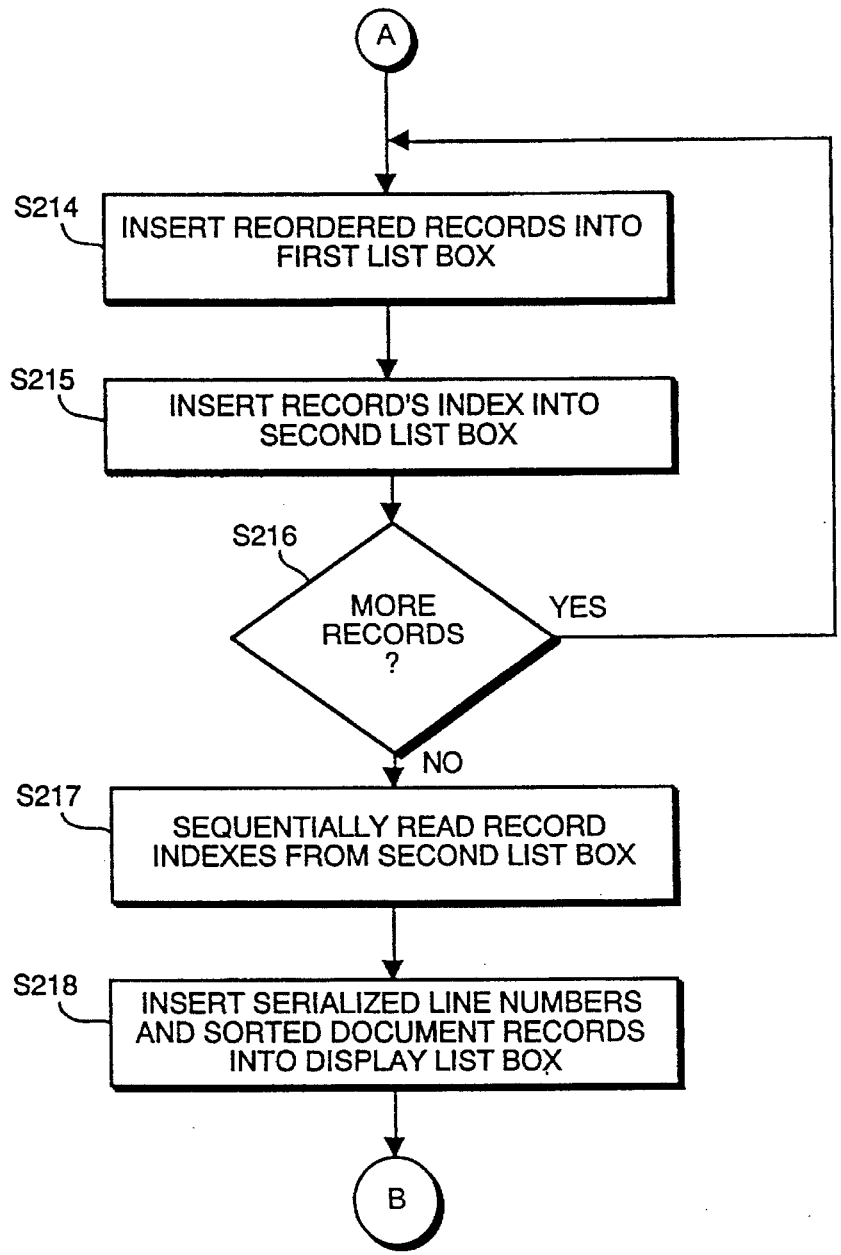
Figure 2:
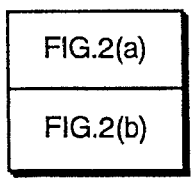

FIG. 2 is a detailed flow diagram showing operation of the FIG. 1 embodiment. In step S201 computing equipment 10 builds a file of document images and creates a document record for each document by which the image for that document may be retrieved. In more detail, via a program instruction file in mass storage 20, CPU 11 causes document scanner 22 to scan in an image of a document. By virtue of operator manipulation of keyboard 19 in conjunction with monitor 17, the operator creates a data record for each document which contains identification information by which the image of the document may later be retrieved. The data record may include subject matter tokens associated with the subject matter of the document as well as an operator-entered name and number for the document, together with a computer-generated creation date and revision date.

The scanned document image, together with its data record, is then stored onto optical disk 21 or into a data file in mass storage 20. In this regard, scanning and building a file of document images, as described in step S201, need not take place within the same computing equipment that accesses those files, and in some circumstances it is preferable for another scanning device to create those files such as a scanning device that is dedicated solely for scanning document images and for creating optical disks containing those images together with a data record by which the document images may be retrieved.

Figure 4:

In step S202, CPU 11 allows an operator select documents for retrieval. In more detail, in accordance with stored program instructions in mass storage 20, CPU 11 causes monitor 17 to display an image such as that illustrated in FIG. 3. As seen in FIG. 3, the display includes twenty-five (25) distinct subject matter tokens such as the token designated at reference numeral 31, as well as an operator accessible name field 32, number field 33 and date fields 34 and 35. Through operator manipulation of keyboard and/or mouse 19, the operator makes selections such as shown in FIG. 4, wherein certain subject matter tokens have been highlighted and the document name, number, revision and creation dates have been designated.

In step S203, CPU 11 retrieves document data records which match the identification characteristics entered by the operator in step S202, and allows the operator to select which columns from those data records should be displayed. Thus, as shown in FIG. 5(a), which is an example of a monitor display generated by CPU 11, the operator has selected to display of the document name and the document number fields as indicated by the check marks in those fields. Similarly, in FIG. 6(a), the operator has selected display of the document name, document number, date created and date revised columns.

In step S203, the operator also designates whether sorting is desired.

In step S204, CPU 11 creates a display list box having an append (or non-sort) style. If the operator did not select sort in step S203, then flow advances through step S205 to step S206 in which the document records are appended to the end of the display list box in an unsorted order. In step S207, the display list box is presented to the operator on monitor 17. For example, in the case where the operator has requested only for the document name and the document number to be displayed (as shown in FIG. 5(a)), then CPU 11 causes the list box illustrated in FIG. 5(b) to be displayed on monitor 17. As seen in FIG. 5(b), the list box is arranged in columns including the document name 36 and the document number 37 (as well as the number of pages 38 in the document). In addition, a line number 39 prefixes each data item and thereby forms the first column in the list box. The line number is useful to the operator in the case where there are many document records having similar appearances since it allows the operator to determine his position within the list.

Similarly, when the operator selects display of the document name and number and the dates created and revised (as shown in FIG. 6(a)), CPU 11 causes the list box shown in FIG. 6(b) to be displayed on monitor 17. Like the list box shown in FIG. 5(b), the list box shown in FIG. 6(b) includes a line number 39 which forms the first column of the list box.

In step S208, CPU 11 allows the operator to scroll through the list box to select a document record. In accordance with the selected item, CPU 11 retrieves the document image corresponding to the selected item (step S109) and displays the document image on monitor 17.

If in step S205, the user designated that the list box should be displayed in sorted order, then flow advances to step S210 in which CPU 11 allows the operator to designate the sort column. In the embodiment here, the sort column may be any one of the columns illustrated in FIG. 6(b) such as the document name, the document number, the date created and the date revised. The line number column 39 is a computer-generated sequential sequence of line numbers which does not vary from list to list; accordingly, in this embodiment, sorting is not permitted on the first column, but rather only on columns other than the first column. Other implementations may permit sorting on the first column as well as any column in the list box, although in such a situation, a standard sorting list box may be used to achieve the desired result.

Figures 7A, 7B:
FIGS. 7(a) and 7(b) are views for explaining how columns in records are reordered.

After designating the sort column, flow advances to step S211 in which the document records are indexed (if they are not already indexed). The indexes in the present embodiment are simple integer indexes, but arbitrary indexes can be used so long as each document record can be accessed by its index. The columns of the document records then are reordered in accordance with the designated sort column such that the designated sort column is first. FIGS. 7(a) and 7(b) illustrate this operation. More particularly, FIG. 7(a) shows four arbitrary records of document information including a first record whose document number is "911", document name is "Navy Text", and document date is Mar. 29, 1990 ("03-29-90"). The records have been indexed "1" through "4" as designated at reference numeral 41. Assuming that in step S210 the operator has designated the document name to be the sort field, then step S211 reorders the columns of the document records such that the document name is the first column and other columns follow thereafter (as depicted in FIG. 7(b)). If desired, in step S210 the operator may also designate sub-sort columns and successive columns in the document records are reordered accordingly. Sub-sort columns, which are other columns in the document records, are useful as "tie-breakers" if the main sort column is identical in more than one document record.

In step S212 CPU 11 creates a first intermediary list box with a sort style and in step S213 the CPU creates a second intermediary list box without the sort style. In this embodiment, the first intermediary list box is labelled "Sort_Box" and the second intermediary list box is labelled "Index_Box". Because the Sort_Box list box is created with a sort style, it will automatically return a sort index which indicates the position into which a new document record has been sorted.

In steps S214 and S215 the reordered document records are inserted into the first list box such that the document records are sorted based on the first column (which corresponds to the selected sort field), and the index for each document record is inserted into the second list box at a position corresponding to the sort index returned from the first list box.

Figure 8A:
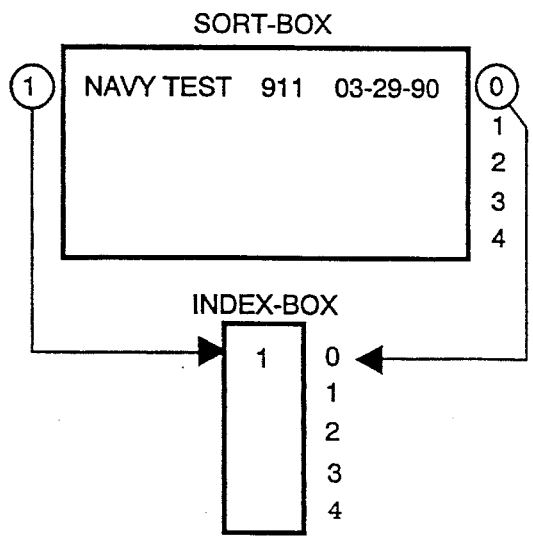
FIGS. 8(a), 8(b), 8(c) and 8(d) are views for explaining how reordered records are inserted into a first intermediary list box and how the sort index returned from the first intermediary list box is used to build the second intermediary list box.
Figure 8B:
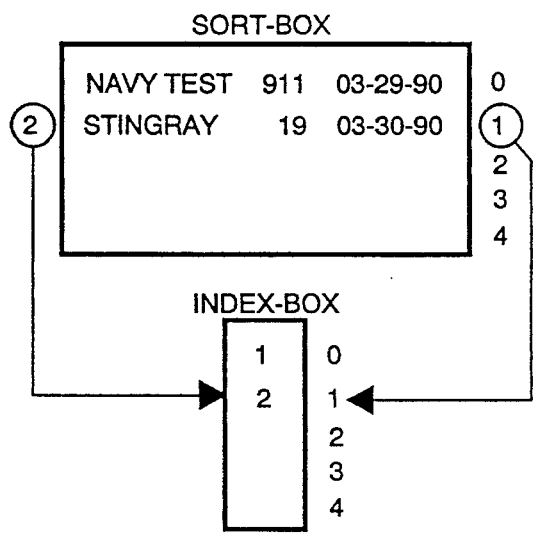

In more detail, in step S214 CPU 11 begins inserting document records with reordered columns into Sort_Box. Referring to FIG. 8(a), CPU 11 first inserts the "Navy Test 911 Mar. 29, 1990" record into Sort_Box. Because Sort_Box has a sort style, it returns its sort index, here "0". In step S215, CPU 11 inserts the index from the document record, here "1", into Index-Box at position 0 which is the sort index returned from Sort_Box. In step S216, CPU 11 determines if there are more data records to process. If there are more data records, flow returns to step S214 to repeat the process. Thus, as shown in FIG. 8(b), CPU 11 inserts the next document record with reordered columns into Sort_Box, here "Stingray 19 Mar. 30, 1990". Sort_Box returns the sort index "1" which CPU 11 uses in step S215 to insert the index corresponding to the "Stingray" record, here "2", into position 1 in Index_Box.

Figure 8C:
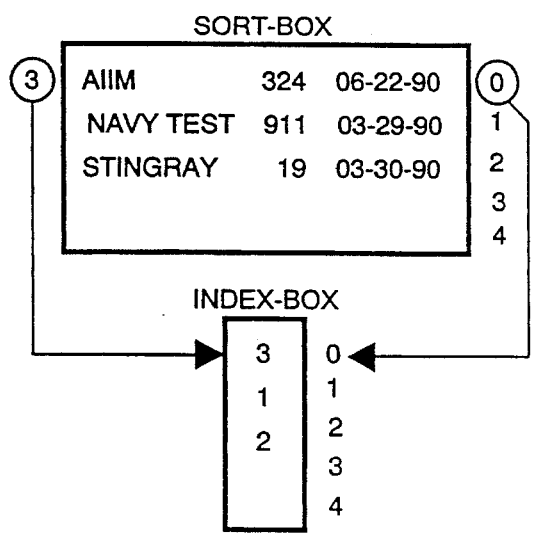
Figure 8D:
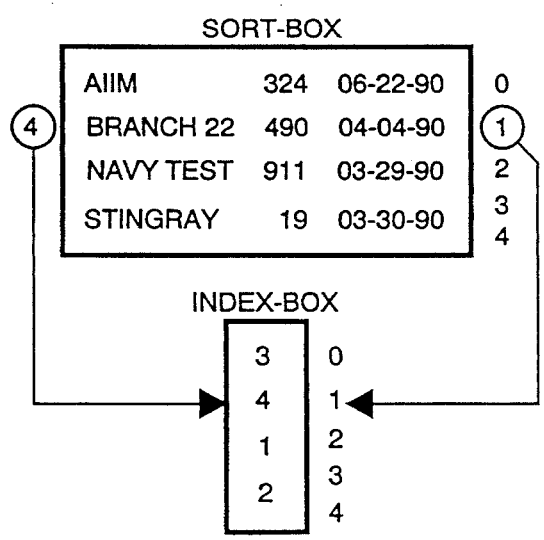

The process is repeated as depicted in FIGS. 8(c) and 8(d) for the remaining records with reordered columns, such that in FIG. 8(c) the "AIIM" record is sorted into the "0" position in Sort_Box and the index "3" for AIIM is inserted into position "0" in Index_Box. Index_Box automatically bumps the succeeding records already stored in Index_Box so that already-stored records are not lost. Likewise, in FIG. 8(d), the "Branch 22" record is sorted into the "1" position in Sort_Box and the index "4" corresponding to the "Branch 22" record is inserted into the "1" position in Index_Box.

When there are no more records remaining to be sorted into Sort_Box, flow advances to step S217. At this point, Sort_Box is no longer needed and may be deleted from memory if desired, so as to utilize memory more efficiently by allowing CPU 11 to overwrite the space previously occupied by Sort_Box. CPU 11 does not overwrite the memory occupied by Index_Box, which now contains a jump table by which CPU 11 can determine the proper sort order for the document records illustrated in FIG. 7(a).

In step S217, CPU 11 sequentially accesses the stored locations in Index_Box. If an ascending sort is desired, then CPU 11 sequentially accesses the locations in Index_Box from beginning to end; conversely, if a descending sort is desired, then CPU 11 sequentially accesses the entries in Index_Box from end to beginning. The index number stored in the sequentially accessed Index_Box is utilized to retrieve a document record in accordance with the index assigned at step S210. In the present embodiment, a serial line number is prefixed at the beginning of each document record, and the resulting string, namely the prefixed serial line number and the document record, is appended to the end of the display list box (step S218). The process is illustrated with respect to FIGS. 9(a) and 9(b).

Figure 9A:
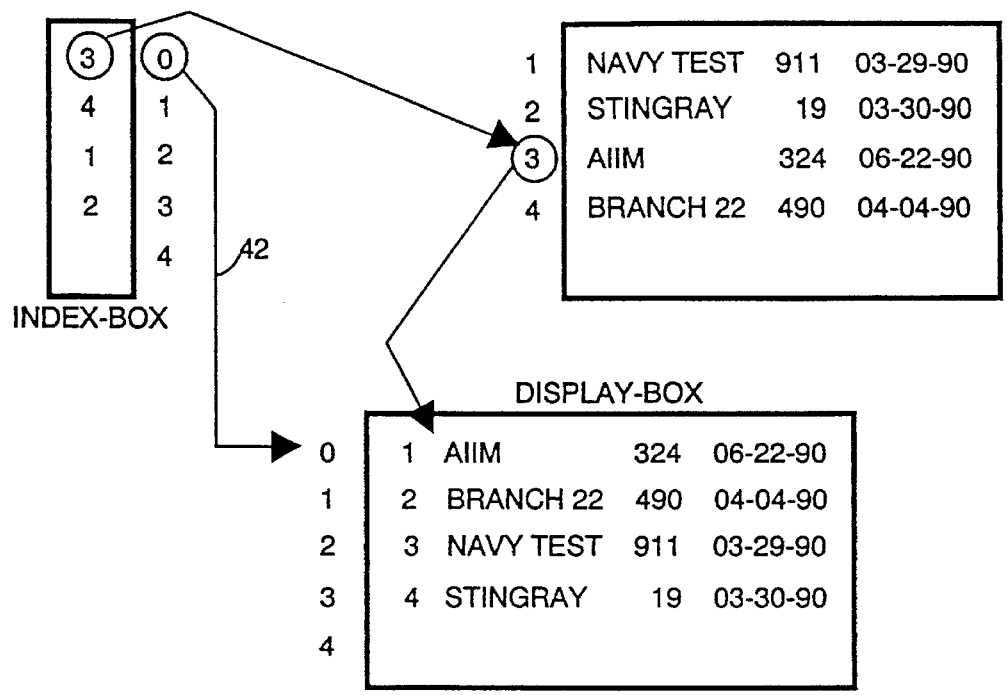
FIGS. 9(a) and 9(b) are views for explaining how the display list box is built from the records and from the second intermediary list box.

More specifically, in FIG. 9(a), as CPU 11 begins its sequential access of the locations in Index_Box, it first encounters record index number "3". CPU 11 utilizes that index to obtain record number 3, "AIIM 324 Jun. 22, 1990" from the reordered records shown in FIG. 7(b). CPU 11 prefixes the entry with the first sequential line number, "1", and appends that to the end of the Display_Box. In like manner, the next sequential index in Index_Box, here "4", is utilized to obtain the next record for appending to Display_Box and the process continues until all indexes stored in Index_Box have been processed. Thus, in FIG. 9(a), a display list box is built in which the sorted column is the second column.

While CPU 11 most conveniently processes Index_Box sequentially from beginning to end (or from end to beginning in the case of a descending sort), it is possible for CPU 11 to access Index_Box in almost any order. This is because the storage locations in Index_Box may be utilized by CPU 11 to designate where in the Display_Box the indexed document record should be inserted, as illustrated diagrammatically by arrow 42.

FIG. 9(a) illustrates a situation in which CPU 11 builds the display box based on the reordered columns of the records from step S211. Because of the jump table stored in Index_Box, however, it is not necessary for CPU 11 to display columns in the reordered sequence. Rather, CPU 11 can display the columns in any sequence, including the original sequence.

Figure 9B:
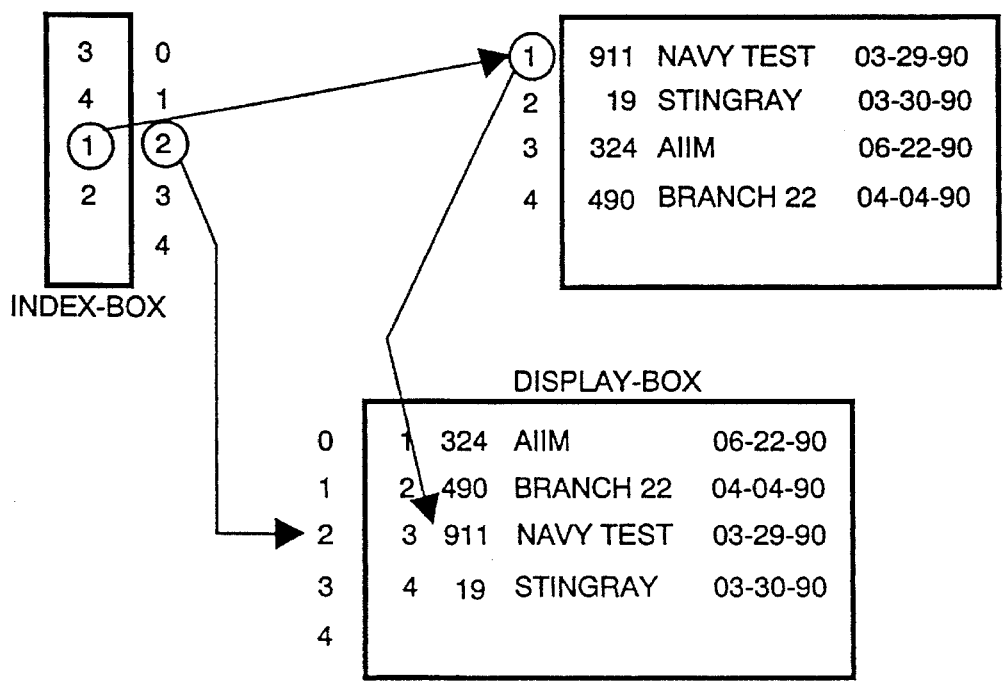
Figure 12:
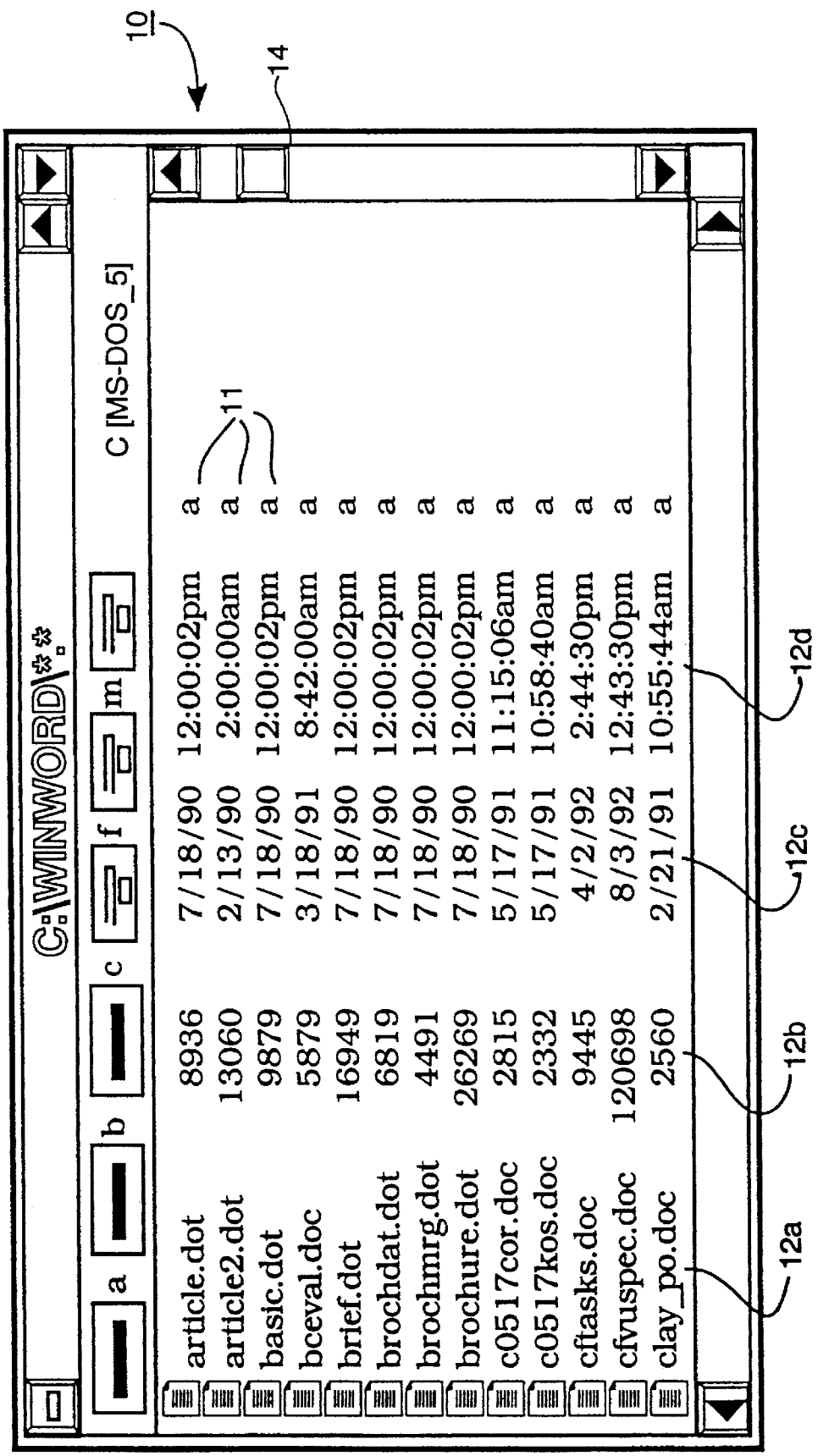
FIG. 12 is a view showing a conventional list box.

Thus, as illustrated in FIG. 9(b), CPU 11 utilizes the storage locations in Index_Box to access the original sequence of columns (from FIG. 7(a)) and insert them into display box. Thus, in FIG. 9(b), a display box is built in which the sorted column is the third column.

Figure 10A:
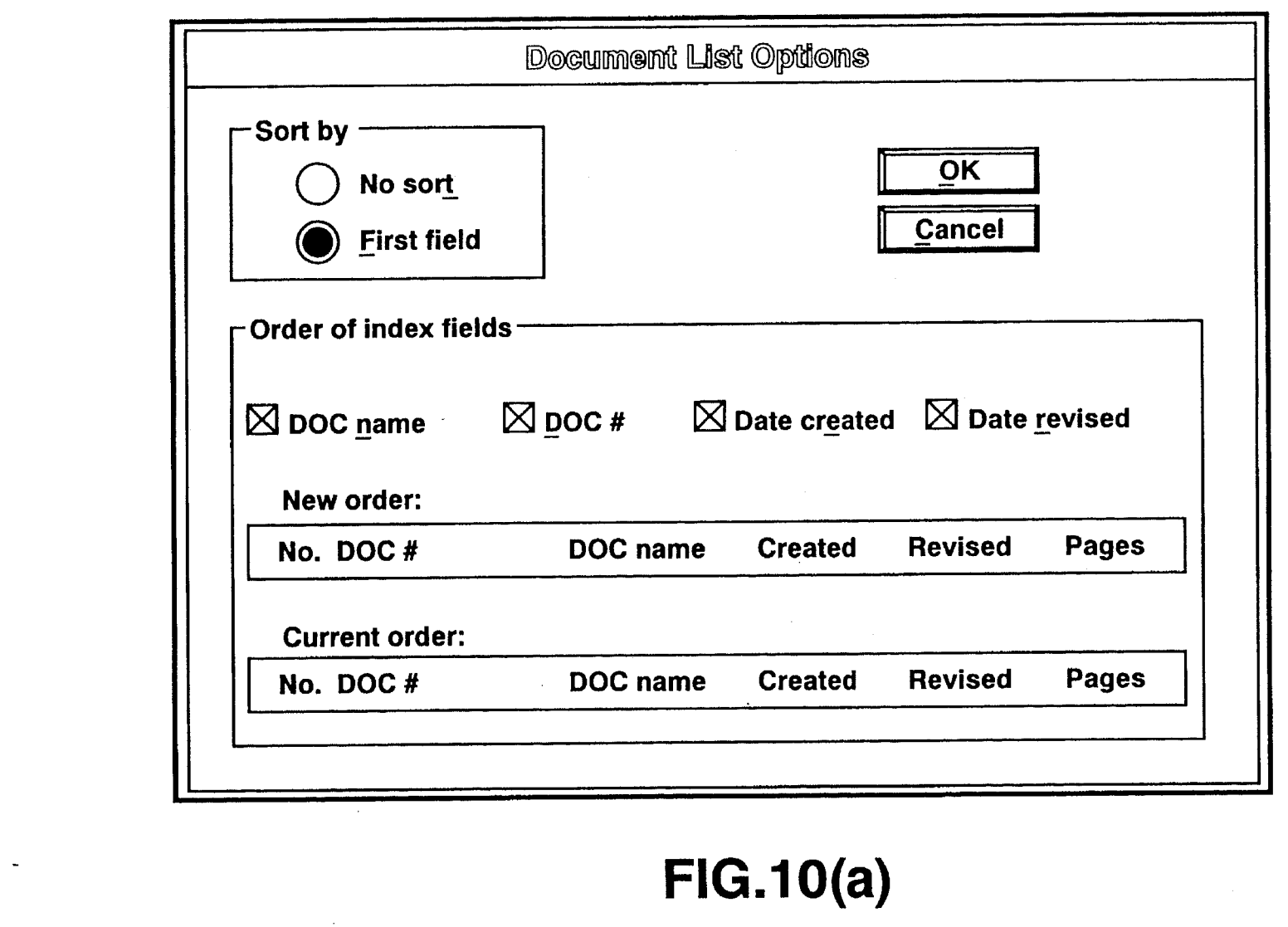

Following step S218, flow proceeds to step S207 where CPU 11 displays the display box. Flow then proceeds to steps S208 and S209 which permit user designation of selected documents for display. Thus, as illustrated in FIG. 10(b), CPU 11 displays document records in document number order (as designated in accordance with the operator selections shown in FIG. 10(a)), and allows a user to retrieve the document image corresponding to the highlighted document record. Likewise, in FIG. 11(b), CPU 11 displays documents in document name order (as set by operator designations shown in FIG. 11(a)), and allows an operator to select one of the documents for viewing on monitor 17.

What is claimed is:

1. Method for sorting indexed records in a computer, the indexed records being organized by columns into a displayable list box, comprising the steps of:

selecting a column for sorting the records;

reordering the columns in each record in accordance with the selected sort column such that the selected sort column is first;

creating a first intermediary list box with a sort style which automatically returns a sort index;

creating a second intermediary list box without a sort style;

inserting each reordered record into the first intermediary list box so as to sort the records based on the selected sort column, and inserting the record index for each reordered record into the second list box at a position corresponding to the sort index returned from the first list box;

accessing the second list box to obtain record indexes stored therein; and storing records corresponding to the stored indexes into the displayable list box.

2. A method according to claim 1, wherein in said storing step records are appended to the end of the displayable list box and wherein in said accessing step the second intermediary list box is accessed sequentially from beginning to end, whereby an ascending sort is obtained.

3. A method according to claim 1, wherein in said storing step records are appended to the end of the displayable list box and wherein in said accessing step the second intermediary list box is accessed sequentially from end to beginning, whereby a descending sort is obtained.

4. A method according to claim 1, wherein said storing step further comprises the step of prefixing each stored record with a sequential line number.

5. A method according to claim 1, wherein in said storing step the stored records are reordered such that the sort column is not the first column in the displayable list box.

6. A method according to claim 5, wherein the stored records are reordered in accordance with said reordering step and further comprising the step of prefixing each record with another column.

7. A method according to claim 6, wherein the another column is a sequential line number.

8. Apparatus for storing electronic records comprised of a plurality of columns into a displayable list box comprising:

a memory including a displayable list box, a first intermediary list box created with a sort style which automatically returns a sort index, and a second intermediary list box created without a sort style;

input means for designating a sort column; and a processor for indexing the records, reordering the columns in each record, creating a first intermediary list box with a sort style which automatically returns a sort index, creating a secondary intermediary list box without a sort style, inserting each reordered record into the first intermediary list box so as to sort the records based on the selected sort column, inserting the record index for each reordered record into the second list box at a position corresponding to the sort index returned from the first list box, accessing the second list box to obtain record indexes stored therein, and storing records corresponding to the stored indexes into the displayable list box.

9. Apparatus according to claim 8, wherein records are appended to the end of the displayable list box and wherein the second intermediary list box is accessed sequentially from beginning to end, whereby an ascending sort is obtained.

10. Apparatus according to claim 8, wherein records are appended to the end of the displayable list box and wherein the second intermediary list box is accessed sequentially from end to beginning, whereby a descending sort is obtained.

11. Apparatus according to claim 8, further comprising prefix means for prefixing each stored record with a sequential line number.

12. Apparatus according to claim 8, wherein the stored records are reordered such that the sort column is not the first column in the displayable list box.

13. Apparatus according to claim 12, further comprising prefix means for prefixing each record with another column.

14. Apparatus according to claim 13, wherein the another column is a sequential line number.

15. Apparatus according to claim 8, wherein said input means includes a monitor, and wherein said monitor displays the displayable list box.

16. Apparatus according to claim 15, wherein said input means is adapted to allow operator selection of a record displayed in the displayable list box.

17. Apparatus according to claim 16, further comprising a second memory for storing document images corresponding to the records, wherein said processor is adapted to retrieve document images in correspondence with an operator selected record and display the document image on said output means.

18. Apparatus according to claim 16, wherein said input means is adapted to input operator-designated retrieval criteria for retrieving the records.

19. A method of sorting columnar data comprised of a plurality of columns to be displayed in a list box for a windowing operating system such that a selected sort may be based upon any one column other than a first column in the columnar data, comprising the steps of:

storing rows of data, including a first row of data and a second row of data, in a plurality of columns, a first column in each row of data containing a first index corresponding to the order in which that row of data was collected;

writing the first row of data from said plurality of columns into a first storage location in a first undisplayed list box, a selected field of said first row of data corresponding to a column in the columnar data upon which the selected sort is based, the first index of the first row of data being written into a second undisplayed list box at a location corresponding to the storage location of said first row of data in said first undisplayed list box;

writing the second row of data from said plurality of columns into a second storage location in the first undisplayed list box, a selected field of said second row of data corresponding to the column upon which the selected sort is based, the first index of the second row of data being written into the second undisplayed list box at a location corresponding to the second storage location of said second row of data in said first displayed list box;

first re-ordering, in said first undisplayed list box, the first row of data and the second row of data based upon the selected sort;

second re-ordering, in said second undisplayed list box, of the first indexes of the first and second rows of data such that the first indice's storage locations in the second display list box correspond to the first re-ordered storage locations of their matching rows of data in the first undisplayed list box, and are indexed by a predetermined sequence of numbers;

repeating these steps for all remaining rows of data; and re-writing all rows of data in said plurality of columns in the order defined by the predetermined sequence of numbers, the re-written rows of data including new, sequential column indicia.

20. Apparatus for storing data comprised of a plurality of columns for display by a list box in a windowing operating system such that the displayed data may be sorted based on a column other than a first column in the plurality of columns of data, comprising:

input means for designating a windowing operating system list box display to be sorted according to a column other than a first column in the plurality of columns of data;

designating means for designating a sort column in the plurality of columns of data which is other than the first column; and a processor, coupled to a memory and to said input means, for (1) writing a plurality of rows of data in said plurality of columns of data into a first memory area, data from the designated sort column being stored at a most significant position of said first memory area, (2) storing, in a second memory area, first column indicia of the rows of data stored in said first memory area, (3) as each new row of data is written into said first memory area, reordering the rows of data in said first memory area based on the data stored at the most significant location in the first memory area, (4) as the rows of data are being re-ordered in the first memory area, correspondingly re-ordering the corresponding first column indicia stored in the second memory area, (5) writing the first column indicia from the second memory area into a third memory area in an order corresponding to a predetermined sequence of numbers also stored in said third memory area, and (6) re-writing, into a fourth memory area, the rows of data from the plurality of columns of data in an order corresponding to the predetermined sequence of numbers, the predetermined sequence of numbers stored in said third memory area being written at a most significant position in the fourth memory area.

21. A computer program product comprising:

a computer-usable medium having computer-readable program code means embodied in the medium for sorting indexed records in a computer, the indexed records being organized by columns into a displayable list box, said computer-readable program code means comprising:

a computer-readable program code means for causing the computer to select a column for sorting the records;

a computer-readable program code means for causing the computer to re-order the columns in each record in accordance with the selected sort column such that the selected sort column is first;

a computer-readable program code means for causing the computer to create a first intermediary list box with a sort style which automatically returns a sort index;

a computer-readable program code means for causing the computer to create a second intermediary list box without a sort style;

a computer-readable program code means for causing the computer to insert each re-ordered record into the first intermediary list box so as to sort the records based on the selected sort column, and to insert the record index for each re-ordered record into the second list box at a position corresponding to the sort index returned from the first list box;

a computer-readable program code means for causing the computer to access the second list box to obtain record indexes stored therein; and a computer-readable program code means for causing the computer to store records corresponding to the stored indexes into the displayable list box.

22. A computer program product according to claim 21, wherein in said computer-readable program code means for causing the computer to store, records are appended to the end of the displayable list box, and wherein in said computer-readable program code means for causing the computer to access, the second intermediary list box is accessed sequentially from beginning to end, whereby an ascending sort is obtained.

23. A computer program product according to claim 21, wherein in said computer-readable program code means for causing the computer to store, records are appended to the end of the displayable list box, and wherein in said computer-readable program code means for causing the computer to access, the second intermediary list box is accessed sequentially from end to beginning, whereby a descending sort is obtained.

24. A computer program product according to claim 21, wherein said computer-readable program code means for causing the computer to store further comprises causing the computer to prefix each stored record with a sequential line number.

25. A computer program product according to claim 21, wherein in said computer-readable program code means for causing the computer to store, the stored records are re-ordered such that the sort column is not the first column in the displayable list box.

26. A computer program product according to claim 25, wherein the stored records are re-ordered in accordance with said computer-readable program code means for causing the computer to re-order, and further comprising causing the computer to prefix each record with another column.

27. A computer program product according to claim 26, wherein the another column is a sequential line number.

28. A computer program product comprising:
- a computer-usable medium having computer-readable program code means embodied in the medium for sorting columnar data comprised of a plurality of columns to be displayed in a list box for a windowing operating system such that a selected sort may be based upon any one column other than a first column in the columnar data, said computer-readable program code means comprising:
- a computer-readable program means for causing the computer to store rows of data, including a first row of data and a second row of data, in a plurality of columns, a first column in each row of data containing a first index corresponding to the order in which that row of data was collected;
- a computer-readable program code means for causing the computer to write a first writing of the first row of data from said plurality of columns into a first storage location in a first undisplayed list box, a selected field of said first row of data corresponding to a column in the columnar data upon which the selected sort is based, the first index of the first row of data being written into a second undisplayed list box at a location corresponding to the storage location of said first row of data in said first undisplayed list box;
- a computer-readable program code means for causing the computer to write a second writing of the second row of data from said plurality of columns into a second storage location in the first undisplayed list box, a selected field of said second row of data corresponding to the column upon which the selected sort is based, the first index of the second row of data being written into the second undisplayed list box at a location corresponding to the second storage location of said second row of data in said first displayed list box;
- a computer-readable program code means for causing the computer to re-order a first re-ordering, in said first undisplayed list box, of the first row of data and the second row of data based upon the selected sort;
- a computer-readable program code means for causing the computer to re-order a second re-ordering, in said second undisplayed list box, of the first indexes of the first and second rows of data such that the first indice's storage locations in the second display list box correspond to the first re-ordered storage locations of their matching rows of data in the first undisplayed list box, and are indexed by a predetermined sequence of numbers;
- a computer-readable program code means for causing the computer to repeat said storing, said first and second writings, and said first and second re-orderings, for all remaining rows of data; and
- a computer-readable program code means for causing the computer to re-write all rows of data in said plurality of columns in the order defined by the predetermined sequence of numbers, the re-written rows of data including new, sequential column indicia.

29. Computer-executable process steps, stored on a computer-readable medium, for sorting indexed records in a computer, the indexed records being organized by columns into a displayable list box, the process steps including:
- a selecting step which selects a column for sorting the records;
- a re-ordering step which re-orders the columns in each record in accordance with the selected sort column such that the selected sort column is first;
- a first creating step which creates a first intermediary list box with a sort style which automatically returns a sort index;
- a second creating step which creates a second intermediary list box without a sort style;
- an inserting step which inserts each re-ordered record into the first intermediary list box so as to sort the records based on the selected sort column, and which inserts the record index for each re-ordered record into the second list box at a position corresponding to the sort index returned from the first list box;
- an accessing step which accesses the second list box to obtain record indexes stored therein; and
- a storing step which stores records corresponding to the stored indexes into the displayable list box.

30. Computer-executable process steps according to claim 29, wherein in said storing step records are appended to the end of the displayable list box, and wherein in said accessing step the second intermediary list box is accessed sequentially from beginning to end, whereby an ascending sort is obtained.

31. Computer-executable process steps according to claim 29, wherein in said storing step records are appended to the end of the displayable list box, and wherein in said accessing step the second intermediary list box is accessed sequentially from end to beginning, whereby a descending sort is obtained.

32. Computer-executable process steps according to claim 29, wherein said storing step further comprises a prefixing step which prefixes each stored record with a sequential line number.

33. Computer-executable process steps according to claim 29, wherein in said storing step the stored columns are re-ordered such that the sort column is not the first column in the displayable list box.

34. Computer-executable process steps according to claim 33, wherein the stored columns are re-ordered in accordance with said re-ordering step, and further comprising a prefixing step which prefixes each record with another column.

35. Computer-executable process steps according to claim 34, wherein the another column is a sequential line number.

36. Computer-executable process steps, stored on a computer-readable medium, for sorting columnar data comprised of a plurality of columns to be displayed in a list box for a windowing operating system such that a selected sort may be based upon any one column other than a first column in the columnar data, the process steps including:

a storing step which stores rows of data, including a first row of data and a second row of data, in a plurality of columns, a first column in each row of data containing a first index corresponding to the order in which that row of data was collected;

a first writing step which writes the first row of data from said plurality of columns into a first storage location in a first undisplayed list box, a selected field of said first row of data corresponding to a column in the columnar data upon which the selected sort is based, the first index of the first row of data being written into a second undisplayed list box at a location corresponding to the storage location of said first row of data in said first undisplayed list box;

a second writing step which writes the second row of data from said plurality of columns into a second storage location in the first undisplayed list box, a selected field of said second row of data corresponding to the column upon which the selected sort is based, the first index of the second row of data being written into the second undisplayed list box at a location corresponding to the second storage location of said second row of data in said first displayed list box;

a first re-ordering step which re-orders, in said first undisplayed list box, the first row of data and the second row of data based upon the selected sort;

a second re-ordering step which re-orders, in said second undisplayed list box, the first indexes of the first and second rows of data such that the first indice's storage locations in the second display list box correspond to the first re-ordered storage locations of their matching rows of data in the first undisplayed list box, and are indexed by a predetermined sequence of numbers;

a repeating step which repeats the storing step, the first and second writing steps, and the first and second re-ordering steps for all remaining rows of data; and a re-writing step which re-writes all rows of data in said plurality of columns in the order defined by the predetermined sequence of numbers, the re-written rows of data including new, sequential column indicia.

* * * * *

UNITED STATES PATENT AND TRADEMARK OFFICE
CERTIFICATE OF CORRECTION

PATENT NO. : 5,563,997
DATED : October 8, 1996
INVENTOR(S) : Clay Fisher

Page 1 of 2

It is certified that error appears in the above-indentified patent and that said Letters Patent is hereby corrected as shown below:

Column 2, line 60, change "characters," to --characters (i.e., non-Roman alphabet characters such as β in German),--.

Column 3, line 42, change "network-in" to --network in--.

Column 4, line 63, delete "of".

Column 6, line 24, change "Mar. 29, 1990" to --03-29-90--.

Column 6, line 33, change "Mar. 30, 1990" to --03-30-90--.

Column 7, line 8, change "Jun. 22, 1990" to --06-22-90--.

UNITED STATES PATENT AND TRADEMARK OFFICE
CERTIFICATE OF CORRECTION

PATENT NO. : 5,563,997
DATED : October 8, 1996
INVENTOR(S) : Clay Fisher

It is certified that error appears in the above-indentified patent and that said Letters Patent is hereby corrected as shown below:

```
    Column 7, line 26, change "FIG. 9(a)" to
--FIG. 9(b)--.

Column 10, line 14, change "reordering" to
--re-ordering--.
```

Signed and Sealed this

Fifteenth Day of April, 1997

*Attest:*

BRUCE LEHMAN

*Attesting Officer*  *Commissioner of Patents and Trademarks*